US008625890B1

(12) United States Patent
Brenner

(10) Patent No.: US 8,625,890 B1
(45) Date of Patent: Jan. 7, 2014

(54) STYLIZING GEOGRAPHIC FEATURES IN PHOTOGRAPHIC IMAGES BASED ON IMAGE CONTENT

(75) Inventor: Claus Brenner, San Jose, CA (US)

(73) Assignee: Google Inc., Mountain View, CA (US)

(*) Notice: Subject to any disclaimer, the term of this patent is extended or adjusted under 35 U.S.C. 154(b) by 150 days.

(21) Appl. No.: 13/317,374

(22) Filed: Oct. 17, 2011

(51) Int. Cl.
*G06K 9/00* (2006.01)

(52) U.S. Cl.
USPC .......................................... 382/165; 382/173

(58) Field of Classification Search
USPC ................................................ 382/165, 173
See application file for complete search history.

(56) References Cited

U.S. PATENT DOCUMENTS

| | | | | |
|---|---|---|---|---|
| 5,214,757 | A * | 5/1993 | Mauney et al. | 715/751 |
| 5,323,317 | A * | 6/1994 | Hampton et al. | 702/3 |
| 5,761,385 | A * | 6/1998 | Quinn | 706/20 |
| 5,988,853 | A * | 11/1999 | Kim et al. | 700/90 |
| 7,313,402 | B1 * | 12/2007 | Rahman | 455/456.1 |
| 2002/0161767 | A1 * | 10/2002 | Shapiro et al. | 707/9 |
| 2005/0089219 | A1 * | 4/2005 | Zhang | 382/167 |
| 2008/0195314 | A1 * | 8/2008 | Green | 701/211 |
| 2008/0284791 | A1 * | 11/2008 | Bressan et al. | 345/589 |
| 2011/0055253 | A1 * | 3/2011 | Yoo et al. | 707/769 |
| 2012/0110008 | A1 * | 5/2012 | Pieper | 707/769 |

OTHER PUBLICATIONS

Adabala, N., et al., "Computer aided generation of stylized maps," *Comp. Anim. Virtual Worlds* 18:133-140, John Wiley & Sons, Ltd., United States (2007).

Vailaya, A., et al., "On Image Classification: City Images VS. Landscapes," *Pattern Recognition* 31(12):1921-1935, Pattern Recognition Society: Elsevier Science Ltd., Great Britain (1998).
Wikipedia, "Adobe Photoshop," 7 pages, edited on Oct. 9, 2011, accessed from http://en.wikipedia.org/wiki/w.index/php?title=Photoshop&oldid=454696951, on May 23, 2012.
Wikipedia, "Digital image processing," 4 pages, edited on Oct. 10, 2011, accessed from http://en.wikipedia.org/wiki/index,php?title=Digital_image_processing&oldid=454838118, on May 23, 2012.
Wikipedia, "Image processing," 3 pages, edited on Oct. 8, 2011, accessed from http://en.wikipedia.org/wiki/index,php?title=Image_processing&oldid=454580959, on May 23, 2012.

* cited by examiner

*Primary Examiner* — Jingge Wu
(74) *Attorney, Agent, or Firm* — Sterne, Kessler, Goldstein & Fox PLLC

(57) ABSTRACT

Embodiments use the content of photographic images to stylize geographic features in the photographic images. In an embodiment, a computer-implemented method stylizes geographic features in a photographic image. In the method, a plurality of pixel regions in the photographic image are identified. For respective pixel regions, a plurality of attributes of image content within the pixel region of the photographic image are identified using the image content, and a geographic content type of the pixel region is determined using a classifier trained to recognize the geographic content type based on the plurality of attributes. Finally, at least one of the plurality of pixel regions of the photographic image are altered based on the respective determined geographic content type to stylize a geographic feature illustrated in the photographic image.

20 Claims, 6 Drawing Sheets
(3 of 6 Drawing Sheet(s) Filed in Color)

STYLIZING GEOGRAPHIC FEATURES IN PHOTOGRAPHIC IMAGES BASED ON IMAGE CONTENT

BACKGROUND

1. Field

This disclosure generally relates to stylizing geographic features in images.

2. Related Art

To stylize maps, cartographers enhance the representation of some geographic features, while deemphasizing others. Moreover, in some cases, cartographers simplify geometries to make maps easier to read while still conveying essential information to a user. For example, maps that are generally available from online mapping services, such as GOOGLE Maps and MICROSOFT BING Maps, typically depict the road network, while omitting other geographic features. Further, the depiction of the roads may not be to scale and, depending on zoom level, may omit minor roads to simplify the image.

Some online mapping services also display aerial photographic images. The aerial images may be overlaid with other information, such as street network, or point labels such as business locations. However, aerial images contain a lot of information. They contain colors, regions, and lines, to form complex patterns that can and may distract the user from any additional information that is superimposed.

Moreover, image processing tools exist for modifying images, such as photographic images. For example, an ADOBE PHOTOSHOP tool allows for selective brightening or dimming of image content. However, manual intervention is normally needed to select manually the regions to be modified.

BRIEF SUMMARY

Embodiments use the content of photographic images to stylize geographic features in the photographic images. In an embodiment, a computer-implemented method stylizes geographic features in a photographic image. In the method, a plurality of pixel regions in the photographic image are identified. For respective pixel regions, a plurality of attributes of image content within the pixel region of the photographic image are identified using the image content, and a geographic content type of the pixel region is determined using a classifier trained to recognize the geographic content type based on the plurality of attributes. Finally, at least one of the plurality of pixel regions of the photographic image are altered based on the respective determined geographic content type to stylize a geographic feature illustrated in the photographic image.

System, method, and computer program product embodiments are also disclosed.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The patent or application file contains at least one drawing executed in color. Copies of this patent or patent application with color drawing(s) will be provided by the Office upon request and payment of necessary fee.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments relate to stylizing aerial photographic images to emphasize or deemphasize geographic features. In an embodiment, a photographic image may be divided into regions having similar characteristics. For example, the photographic image may be divided into regions having similar color bands, such as red green and blue color bands. Those regions are each analyzed to determine attributes. For example, the regions may be analyzed to determine the degree to which the red, green, and blue colors are represented in each region. Similarly, a magnitude of infrared light detected within the region may be determined. Further, stereo matching may be used to determine an altitude of the region in the photographic image. Based on these attributes, a content type of the region may be determined. Finally, the content type is used to alter the region of the photographic image to stylize a geographic feature having the content type. Altering the region may involve brightening, dimming, color modifying, or blurring to emphasize or deemphasize the geographic feature.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

System

Figure 1:
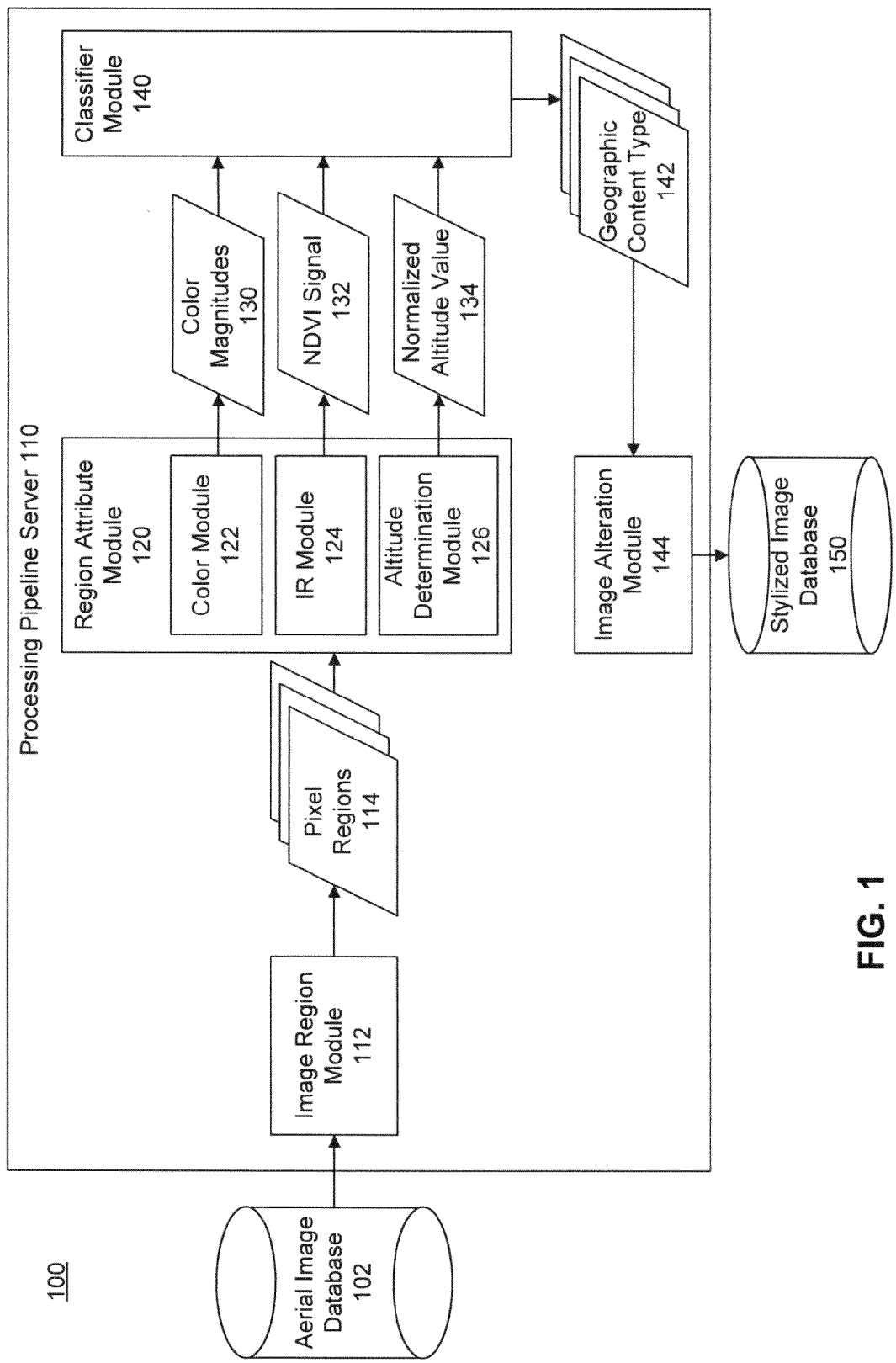
FIG. 1 is a diagram illustrating a system for stylizing geographic features in aerial photographic images, according to an embodiment.

FIG. 1 is a diagram illustrating a system 100 for stylizing geographic features in aerial photographic images, according to an embodiment. System 100 includes an aerial image database 102, a processing pipeline server 110, and a stylized image database 150. Processing pipeline server 110 includes an image region module 112, a region attribute module 120, a classifier module 140, and an image alteration module 144.

In an example operation, image region module 112 retrieves an image from aerial image database 102. Image region module 112 identifies a plurality of pixel regions 114 in the retrieved image. Region attribute module 120 analyzes each pixel region 114 to determine a variety of attributes associated with pixel region 114. The attributes shown in FIG. 1 include color magnitudes 130, Normalized Difference Vegetation Index (NDVI) signal 132, and a normalized altitude value 134. Based on these signals, classifier module 140 determines a geographic content type for the pixel region. In one embodiment, region attribute module 120 and classifier module 140 may repeatedly or in parallel analyze each pixel region 114 determine a respective geographic content type 142. Based on the respective content types 142, image alteration module 144 determines a stylized version of the retrieved image and stores the stylized image in stylized image database 150. Each of these modules and their functionality are described in greater detail below.

Aerial image database 102 stores aerial photographic images. The images may be taken from an airplane or satellite, may have an oblique or nadir perspective of Earth images, and may be orthorectified, for example, to be displayed with map data. The images may have been stitched together from a variety of images covering overlapping geographic regions. For each image, the photographic image data may include light information for each pixel in the image. The light information may include not only traditional red, green, and blue light magnitudes, but also a light magnitude for infrared signals detected at that pixel. Moreover, each image may have corresponding panchromatic (i.e., black and white) image data.

From aerial image database 102, image region module 112 may retrieve a digital photographic image. In the photographic image, image region module 112 identifies a plurality of pixel regions 114. The pixel regions may have similar characteristics. For example, each pixel region may have pixels that generally fall in a narrow color range. A variety of image segmentation techniques may be used to partition the image into regions. The image segmentation algorithm may try to detect edges between the various regions. In one example embodiment, to detect the edges, color or intensity values for the various pixels may be placed in a histogram and the histogram may be analyzed for peaks and valleys. In this way, the image may be divided into image regions, and the image regions may be analyzed holistically.

By analyzing a region with plurality of pixels together, the category type determinations may be less sensitive to noise between individual pixels. However, in an alternative embodiment, image region module 112 may simply divide the image into individual pixels, and each of pixel regions 114 may consist of only one pixel from the retrieved image.

For each of the respective pixel regions 114, region attribute module 120 identifies a plurality of attributes of image content within the pixel region. Based on the image attributes, classifier module 140 determines a geographic content type 142 associated with the respective pixel region 114.

To determine image attributes for the image region, region attribute module 120 includes various submodules that each determine a different type of attribute for the region. In particular, region attribute module 120 includes a color module 122, an IR module 124, and an altitude determination module 126. Each of these subcomponents is described below.

Color module 122 determines color magnitudes 130 for the pixel region. Each color magnitude 130 may be a magnitude corresponding to the strength or relative strength of light at a particular wavelength within the pixel region. For example, color magnitudes 130 may include a red magnitude, a green magnitude, and a blue magnitude. The respective magnitudes may be determined, for example, by averaging the magnitudes of each pixel in a pixel region.

Similar to color module 122, IR module 124 determines an IR magnitude of infrared signals captured for the pixel region of the photographic image. In one embodiment, IR module 124 may use the IR magnitude to determine a Normalized Difference Vegetation Index (NDVI) for the pixel region. The NDVI may be a value representing the likelihood that the pixel region represents live green vegetation. The likelihood that the pixel region represents vegetation may increase as the IR magnitude increases and may decrease as the red color magnitude increases. Accordingly, the NDVI may be calculated using the following formula: $NDVI=(I-R)/(I+R)$, where I represents the magnitude of infrared signals in the pixel region and R represents the magnitude of red signals in pixel region. In an example, if the end NDVI exceeds 0.2 the region may very likely contain vegetation.

Altitude determination module 126 determines an altitude value representing the altitude of the geographic area represented in the pixel region. In an embodiment, altitude determination module 126 may determine an altitude value for each respective pixel in the pixel region of the photographic image.

To determine the altitude for respective pixels, multiple overlapping aerial images taken from different perspectives may be used. For example, a stereo matching algorithm may be used to correlate different features from two images and triangulate their position relative the cameras. Other algorithms may be used, such as plane matching and dense stereo matching. Other algorithms may be used, which compute a dense stereo matching, i.e., produce one altitude for every pixel of the aerial image. This may use methods like plane sweep stereo. To determine the altitude, panchromatic (black-and-white) image data may be used. Altitude determination module 126 may average the altitude values for the respective pixels in the pixel region to determine an altitude value for the entire pixel region.

Moreover, altitude determination module 126 may normalize the altitude value determined for the pixel region against an altitude value for the geographic region to determine a normalized altitude value 134. In an example, the altitude value for the pixel region may be normalized by simply subtracting an altitude value representing the ground of the geographic region. In this way, by normalizing the value, the altitude value may represent a relative height of the pixel region and may become more probative of whether the pixel region represents an above-ground structure, such as a building or tree.

Once attributes of the pixel region, including color magnitudes 130, NDVI signal 132, and normalized altitude value 134, are determined, the attributes may be used by classifier module 140 to determine a geographic content type 142 of the pixel region. Classifier module 140 uses a classifier trained to recognize the geographic content type based on the plurality of attributes using a smaller subset of images. Classifier module 140 may use any one of a number of different types of classification algorithms, such as k-means clustering, artificial neural network, or statistical classification. To use classifier module 140, the classification algorithm may first need to be manually trained. Manual training may involve a user identifying geographic content types within images. After manually training a small percentage of the images, classifier module 140 can then be used to determine automatically geographic content types for the remaining images.

In an embodiment, classifier module 140 may map each pixel region 114 into one of four possible geographic content types—"building," "ground," "tree," and "grass." With these content types, classifier module 140 may utilize some relatively simple heuristics to determine the geographic content type for each imagery region. For example, if the altitude value 134 exceeds a first threshold value, the geographic content type may be either "building" or "tree" depending on whether the NDVI signal 132 exceeds a second threshold value. If the altitude value 134 does not exceed the first threshold value, the geographic content type may be either "ground" or "grass" again depending on whether the NDVI signal 132 exceeds the second threshold.

Once a geographic content type 142 is determined for each of the pixel regions 114, image alteration module 144 alters the pixel regions of the photographic image based on the respective determined geographic content type 114 to stylize a geographic feature illustrated in the photographic image. In a first example, all pixel regions having a particular geographic content type may be brightened, and all pixel regions not having the particular geographic content type may be darkened. This may serve to emphasize the geographic features within the pixel regions having the particular geographic content type. In an embodiment, when stylizing the photographic image, image alteration module 144 may blend the edges of the respective pixel regions. The stylization may be done using predefined settings or may be set or adjusted by a user using stylization controls.

In a second example, all pixel regions not having a particular geographic content type may be blurred, and all pixel regions having the particular geographic content type may be sharpened. This may create a sense that the pixel regions not having the particular geographic content type are out of focus. In this way, the user's attention may be drawn to the geographic features in the image regions having the particular geographic content type.

In the third example, in pixel regions having a particular content type, the colors may be simplified. For example, an average color of all pixel regions having a particular geographic content type may be determined, and every pixel in a pixel region having the particular geographic content type may be set to the average color. In this way, potentially distracting details of the geographic image may be removed.

Similarly, image alteration module 144 may otherwise alter the colors in the pixel regions based on the respective geographic content type. For example, buildings may be made more reddish and vegetation may be made more greenish.

Once image alteration module 144 has altered pixel regions of the aerial image according to their respective geographic content type, image alteration module 144 may store the altered image into stylized image database 150. Stylized image database 150 may be available to a mapping service, and a stylized image stored in database 150 may be served to users in response to a request. Additional use cases of stylized images, including the creation of the content type mask, are described with respect to FIG. 2.

Figure 2:
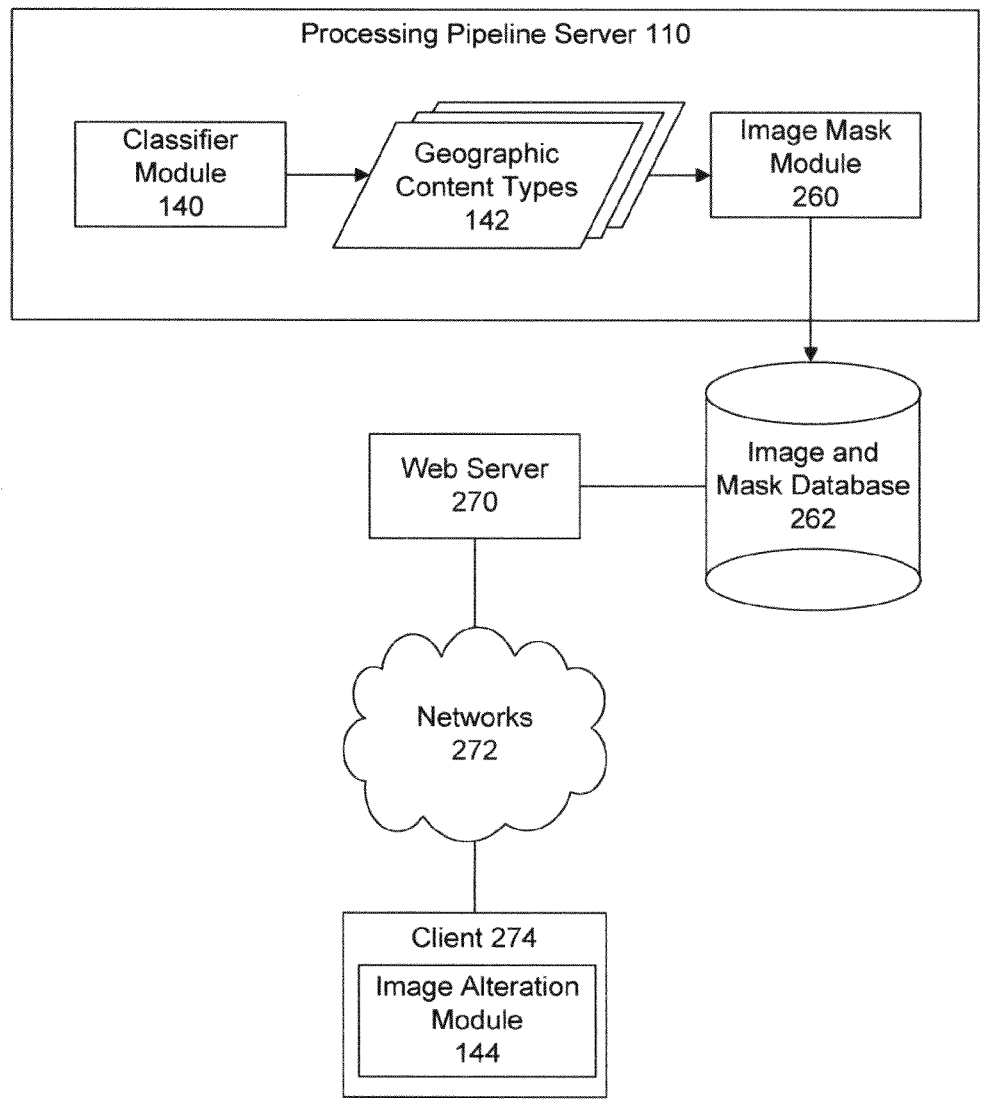
FIG. 2 is a diagram illustrating a system for generating a content type mask for a geographic photographic image that can be used to stylize an image, according to a further embodiment.

FIG. 2 is a diagram illustrating a system 200 for generating a content type mask for a geographic photographic image that can be used to stylize an image, according to a further embodiment. Similar to system 100 and FIG. 1, system 200 includes a processing pipeline server 110 and a classifier module 140 that generates geographic content types 142 corresponding to respective pixel regions of the aerial photographic image. In FIG. 2, processing pipeline server 110 further includes an image mask module 260 coupled to an image and mask database 262.

In FIG. 1, image alteration module 144 is shown on processing pipeline server 110. However, in system 200 in FIG. 2, image alteration module 144 resides on a client 274. Client 274 may communicate with a web server 270 via one or more networks 272. In another example not shown, the image alteration module may reside on the web server 270 and may be accessible to client 274 via one or more web services.

In general, system 200 may operate as follows. As described above with respect to FIG. 1, classifier module 140 may generate geographic content types 142 specifying a content type for respective pixel regions in an aerial image. Based on the geographic content types 142, image mask module 260 may generate an image mask that maps pixels of the aerial image to corresponding content types. Image mask module 260 may store the content type mask associated with the aerial image in image mask database 262. In response to requests from client 274, web server 270 may retrieve both the aerial image and a content type mask from image and mask database 262. Web server 270 may then send the image and mask back to client 274. On client 274, image alteration module 144 may stylize geographic features in the aerial image using the content type mask. Each of these modules and their operation are described in greater detail below.

Image mask module 260 determines a content type mask that maps each pixel in the photographic image to a corresponding geographic content type determined by the classifier module 140. As mentioned above, the geographic content types 142 each specify a content type for pixel region in the aerial image. To determine the mask, image mask module 260 may set a value for each pixel in the aerial image. More specifically, for each pixel in the aerial image, image mask module 260 may determine which pixel region the pixel resides in and which geographic content type 142 corresponds to that pixel region. The determined content type may be set to that pixel location in the mask.

As mentioned above, in an embodiment there may be four geographic content types—ground, building, grass, and tree. In that embodiment, the mask may allocate two bits for each pixel in the aerial image. In this way, the content mask may not consume very much space.

Once determined by image mask module 260, image mask module 260 stores the content mask along with the aerial image in image and mask database 262.

Web server 270 may provide a mapping service accessible via one or more networks 272. When a client, such as client 274, requests an aerial image, web server 270 may retrieve both the aerial image and the content type mask associated with the aerial image and send both back to the client.

When the client, such as client 274, receives the aerial image in the content type mask from web server 270, image alteration module 144 alters portions of the aerial image based on the content type mask. In this way, image alteration module 144 can stylize geographic features in the aerial image on the client side. When the user takes an action that involves stylizing a geographic feature, image alteration module 144 may use the content type mask to determine what type of geographic information resides at each pixel in the aerial image. Using that information, image alteration module 144 may emphasize geographic features in the aerial image that are likely to be of interest and deemphasize geographic features in aerial image that are not likely to be of interest.

In a first example, the user may search for addresses or points of interest, such as businesses, within the aerial image. In that example, areas having a "building" content type may be brightened, and areas having a "road" or other content type may be dimmed or darkened. Moreover, using information in the content type mask, client 274 may position labels for the businesses in areas of the aerial image that are not designated as having a "building" content type. In this way, the labels are less likely to obscure buildings that may be of interest. Further, if the text of the labels are white, they may be more readable when placed on the darker areas of the image.

In a second example, a user may request routing directions, such as driving directions. In that example, roads are likely to be of more interest than other features displayed in the aerial image. For that reason, areas having a "road" content type in a content type mask may be brightened, and areas having other content types (such as buildings and trees) may be dimmed.

In a third example, image alteration module 144 may alter specific pixel regions, as opposed to altering all pixel regions having a particular content type. When the user hovers the mouse across a building, for example, the building may be brightened while other areas of the aerial image may be dimmed. To alter the specific pixel region, image alteration module 144 may identify a region of contiguous pixels having the same content type in the content type mask. Then, image alteration module 144 may alter that region.

Each of processing pipeline server 110, web server 270, and client 274 may be implemented on any computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Each of image region module 112, region attribute module 120, color module 122, IR module 124, altitude determination module 126, classifier module 140, image alteration module 144, and image mask module 260 may be implemented in hardware, software, firmware, or any combination thereof.

Each of aerial image database 102, stylized image database 150, and image mask database 262 may be any type of structured memory, including a persistent memory. In examples, each database may be implemented as a relational database. It may be also implemented as part of a distributed storage system (e.g., "stored in the cloud"), which is not a relational database.

Method

Figure 3:
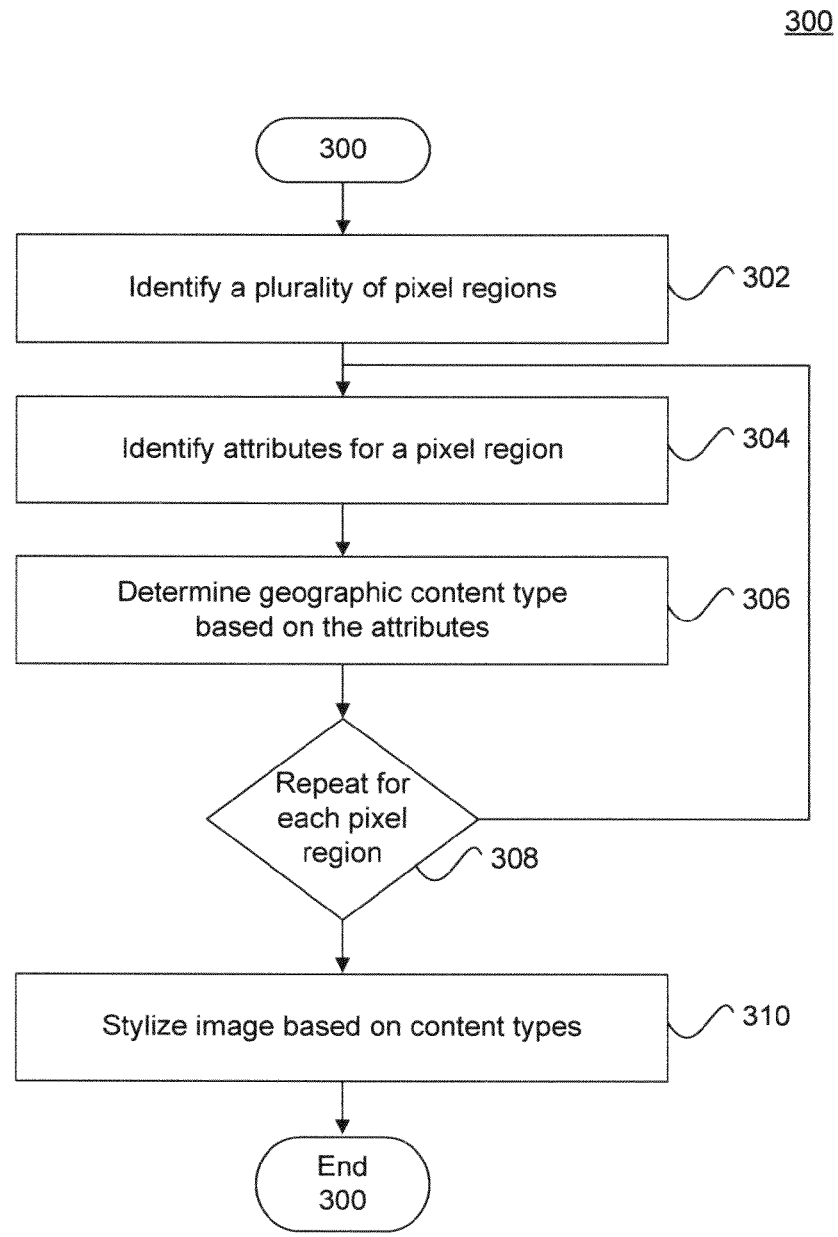
FIG. 3 is a flowchart illustrating a method for stylizing geographic features in aerial photographic images, according to an embodiment.

FIG. 3 is a flowchart illustrating a method 300 for stylizing geographic features in aerial photographic images, according to an embodiment. In embodiments, method 300 may be used in operation of systems 100 and 200 in FIGS. 1 and 2.

Method 300 begins by identifying a plurality of pixel regions of an aerial image at step 302. The pixel regions may each include areas the of the aerial image having similar characteristics, such as color.

After the pixel regions are identified, steps 304 and 306 are repeated for each of the respective pixel regions, as illustrated by decision block 308. While FIG. 3 illustrates sequential operation of steps 304 and 306, the skilled artisan would recognize that steps 304 and 306 may occur in parallel for each of the respective pixel regions.

At step 304, a plurality of attributes of image content within the pixel region are identified using the image content. The attributes may include a color magnitude for respective colors in the region. Similarly, the attributes may include a magnitude of infrared light captured in the region, or a calculated NDVI signal indicating a likelihood that the region illustrates vegetation. Finally, the attributes may include a relative height of objects in the region. The height may be relative to a height in the aerial image as a whole.

At step 306, a geographic content type of the pixel region is determined using a classifier trained to recognize the geographic content type based on the plurality of attributes.

Once the geographic content type for each of the respective pixel regions is determined, the images are altered based on the content type to stylize geographic features within the image at step 310. In a first embodiment, the altering may include inserting highlighting into the photographic image to emphasize a particular pixel region. In a second embodiment, the altering may include determining an average color of all pixel regions having a particular geographic content type and setting every pixel in a pixel region having the particular geographic content type to the determined average color. In a third embodiment, the altering may include brightening or dimming regions of a content type mask having a particular geographic content type. Finally, in a fourth embodiment, the altering may include blurring or sharpening regions having a particular geographic content type.

The altering of step 310 may involve altering the original file. Alternatively, the altering may be applied when the original image file is rendered by the client. In that embodiment, the defined style effects may be pre-defined so that when the image is rendered for display, the client applies the pre-defined style without altering the original image Method 300 may for example, be performed by a computing device executing a program of instructions tangibly embodied in a non-transitory computer-readable medium.

In this way, method 300 enables stylization of geographic features within an aerial photographic image. Examples of stylizing an aerial image are illustrated in FIGS. 4-6 below.

Example Images

Figure 4:
FIG. 4 is an aerial photographic image.

FIG. 4 shows an aerial photographic image 400. Image 400 may be taken from for example an aircraft or satellite. Image 400 shows an urban area from a nadir perspective. Image 400 includes much detail that may be unnecessary and distracting to a user. For example, image 400 includes trees, buildings, and roads.

Figure 5:
FIG. 5 shows the aerial photographic image of FIG. 4 that has been stylized to emphasize buildings and trees.
Figure 6:
FIG. 6 shows the aerial photographic image of FIG. 4 that has been stylized to emphasize roads.

FIG. 5 shows a modified image 500. Modified image 500 has been determined from the aerial photographic image 400 in FIG. 4 and has been stylized to emphasize buildings and trees in accordance with an embodiment. In image 500, trees have been made greener, roads have been made darker, and buildings have been made brighter.

Similarly, FIG. 6 shows a modified image 600. Modified image 600 has been determined from the aerial photographic image 400 in FIG. 4 and has been stylized to emphasize roads in accordance with an embodiment. In image 600, buildings have been made darker.

Additional Advantages

Some embodiments may have additional advantages not specifically enumerated above. First, geographic content types are computed by pixel operations only. No feature extraction, object detection, or modeling are necessary. Thus, production of the enhanced aerial images is much cheaper than the production of maps.

Second, in a conventional map, errors (such as building footprints with incorrect shapes) may be easy to discover and may be disturbing to a user. However, in the proposed enhanced images, those errors may be easier to oversee. Thus, embodiments may be more forgiving and may require less quality assurance resources in production.

Third, in contrast to conventional maps, no manual editing may be required to stylize aerial images according to embodiments.

Fourth and finally, detected regions may be used as "proxies" to the real geometry. In other words, regions, which are just connected sets of identically classified pixels, are used as a substitute for exactly mapped regions, which are not available since it is too expensive to obtain them. For example, if the desired behavior is to "brighten" a building when the mouse pointer hovers over it, building footprint information would normally be needed to determine when the mouse is over the building and which pixels are to be highlighted. However, according to embodiments using just connected pixel regions, the same effect may be achieved without needing an exact building footprint.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for stylizing geographic features in a photographic image, comprising:
    (a) identifying a plurality of pixel regions in the photographic image;
    for each pixel region in the plurality of pixel regions:
    (b) identifying a plurality of attributes of image content within the pixel region of the photographic image using the image content, the identifying (b) comprising determining altitude values for respective pixels in the pixel region of the photographic image;
    (c) normalizing the altitude values for respective pixels in the pixel region against an altitude value representing an altitude of the ground in a geographic region illustrated in the photographic image;
    (d) determining a geographic content type of the pixel region using a classifier trained to recognize the geographic content type based on the plurality of attributes, the determining (d) comprising determining whether the geographic content type is a man-made structure based, at least in part, on the normalized altitude values for respective pixels, wherein a likelihood of the geographic content type being determined to be a man-made structure increases as the normalized altitude value increases; and
    (e) altering at least one of the plurality of pixel regions of the photographic image based on the respective determined geographic content type to stylize a geographic feature illustrated in the photographic image.

2. The method of claim 1, wherein the identifying (b) further comprises determining a color magnitude of each of a plurality of colors illustrated within the pixel region of the photographic image, and
    wherein the determining (d) comprises determining the geographic content type based, at least in part, on each color magnitude identified in (b).

3. The method of claim 2, wherein the identifying (b) further comprises determining an IR magnitude of infrared signals captured for the pixel region of the photographic image, and
    wherein the determining (d) further comprises determining whether the geographic content type is vegetation based, at least in part on, on the IR magnitude and a color magnitude of a red color within the pixel region identified in (b), wherein a likelihood of the geographic content type being determined to be vegetation increases as the IR magnitude increases, and the likelihood decreases as the red magnitude increases.

4. The method of claim 1, further comprising:
    (f) determining a content type mask that maps each pixel in the photographic image to a corresponding geographic content type determined in (d), and
    wherein altering (e) comprises altering the at least one pixel region based on the content type mask determined in (f).

5. The method of claim 1, wherein altering (e) comprises inserting highlighting into the photographic image to emphasize a particular pixel region.

6. The method of claim 1, wherein altering (e) comprises altering the photographic image such that all pixel regions having a particular geographic content type are brightened relative to all pixel regions not having the particular geographic content type.

7. The method of claim 1, wherein altering (e) comprises altering the photographic image such that all pixel regions not having a particular geographic content type are blurred relative to all pixel regions having the particular geographic content type.

8. The method of claim 1, wherein altering (e) comprises:
    (i) determining an average color of all pixel regions having a particular geographic content type; and
    (ii) setting every pixel in a pixel region having the particular geographic content type to the average color determined in (i).

9. The method of claim 1, wherein determining (d) comprises selecting the geographic content type from the group consisting of roads, buildings, grass, and trees.

10. A computer-implemented system for stylizing geographic features in a photographic image, comprising:
    an image region module that identifies a plurality of pixel regions in the photographic image;
    a region attribute module that, for each pixel region in the plurality of pixel regions, identifies a plurality of attributes of image content within the pixel region of the photographic image based on content within the pixel region, wherein the region attribute module comprises an altitude determination module that, for the respective pixel regions:

(i) determines an altitude value for respective pixels in the pixel region of the photographic image, and (ii) normalizes the altitude values for respective pixels in the pixel region against an altitude value representing an altitude of the ground in the geographic region illustrated in the photographic image;

a classifier module trained to recognize the geographic content type based on the plurality of attributes, wherein the classifier module determines a geographic content type for each of the respective pixel regions using a classifier, and wherein the classifier module determines whether the geographic content type is a man-made structure based, at least in part, on the normalized altitude values for respective pixels determined by the altitude determination module, wherein a likelihood of the geographic content type being determined to be a man-made structure increases as the normalized altitude value increases; and an image alteration module that alters at least one of the plurality of pixel regions of the photographic image based on the respective determined geographic content type to stylize a geographic feature illustrated in the photographic image.

11. The system of claim 10, wherein the region attribute module determines a color magnitude of each of a plurality of colors illustrated within the pixel region of the photographic image, and wherein the classifier module determines the geographic content type based, at east in part, on each color magnitude determined by the region attribute module.

12. The system of claim 11, wherein the region attribute module determines an IR magnitude of infrared signals captured for the pixel region of the photographic image, and wherein the classifier module determines whether the geographic content type is vegetation based, at least in, part on, on the IR magnitude and a color magnitude of a red color within the respective pixel region, wherein a likelihood of the geographic content type being determined to be vegetation increases as the IR magnitude increases, and the likelihood decreases as the red magnitude increases.

13. The system of claim 10, further comprising:

an image mask module that determines a content type mask that maps each pixel in the photographic image to a corresponding geographic content type determined by the classifier module, and wherein the image alteration module alters the at least one pixel region based on the content type mask.

14. The system of claim 10, wherein image alteration module inserts highlighting into the photographic image to emphasize a particular pixel region.

15. The system of claim 10, wherein image alteration module alters the photographic image such that all pixel regions having a particular geographic content type are brightened relative to all pixel regions not having the particular geographic content type.

16. The system of claim 10, wherein the image alteration, module alters the photographic image such that all pixel regions not having a particular geographic content type are blurred relative to all pixel regions having the particular geographic content type.

17. The system of claim 10, wherein image alteration module:

(i) determines an average color of all pixel regions having a particular geographic content type, and (ii) sets every pixel in a region having the particular geographic content type to the average color.

18. The system of claim 10, wherein classifier module selects the geographic content type from the group consisting of roads, buildings, grass, and trees.

19. A computer-implemented system for stylizing geographic features in a photographic image, comprising:

a server configured to:

(i) identify a plurality of pixel regions in the photographic image, for each pixel region in the plurality of pixel regions:

(ii) identify a plurality of attributes of image content within the pixel region of the photographic image based on image content within the pixel region, the plurality of attributes including altitude values for respective pixels in the pixel region of the photographic image, (iii) normalize the altitude values for respective pixels in the pixel region against an altitude value representing an altitude of the ground in a geographic region illustrated in the photographic image;

(iv) determine whether a geographic content type of the pixel region is a man-made structure using a classifier trained to recognize the geographic content type based on the plurality of attributes including the normalized altitude values for respective pixels such that a likelihood of the geographic content type being determined to be a man-made structure increases as the normalized altitude value increases, (v) alter at least one of the plurality of pixel regions of the photographic image based on the respective determined geographic content type to stylize a geographic feature illustrated in the photographic image, and (vi) provide the altered image over a network in response to a request;

a client configured to receive the altered image from the server via the network and display the image as a map.

20. A nontransitory program storage device embodying a program of instructions executable by at least one machine to perform a method for stylizing geographic features in a photographic image, said method comprising:

(a) identifying a plurality of pixel regions in the photographic image, for each pixel region in the plurality of pixel regions:

(b) identifying a plurality of attributes of image content within the pixel region of the photographic image based on image content within the pixel region, the plurality of attributes including altitude values for respective pixels in the pixel region of the photographic image, (c) normalizing the altitude values for respective pixels in the pixel region against an altitude value representing an altitude of the ground in a geographic region illustrated in the photographic image;

(d) determining whether a geographic content type of the pixel region is a man-made structure using a classifier trained to recognize the geographic content type based on the plurality of attributes including the normalized altitude values for respective, pixels such that a likelihood of the geographic content type being determined to be a man-made structure increases as the normalized altitude value increases; and (e) altering at least one of the plurality of pixel regions of the photographic image based on the respective determined geographic content type to stylize a geographic feature illustrated in the photographic image.

* * * * *

UNITED STATES PATENT AND TRADEMARK OFFICE
CERTIFICATE OF CORRECTION

| | |
|---|---|
| PATENT NO. | : 8,625,890 B1 |
| APPLICATION NO. | : 13/317374 |
| DATED | : January 7, 2014 |
| INVENTOR(S) | : Brenner |

It is certified that error appears in the above-identified patent and that said Letters Patent is hereby corrected as shown below:

In the Claims

Column 11, line 29, claim 11, after "based, at", please delete the word "east" and insert the word --least--

Column 11, line 35, claim 12, please delete "," after "at least in"

Column 11, line 57, claim 16, please delete "," after "alteration"

Column 12, line 1, claim 17, after "pixel in a", please insert the word --pixel--

Column 12, line 57, claim 20, please delete "," after "respective"

Signed and Sealed this
Eighteenth Day of November, 2014

Michelle K. Lee
*Deputy Director of the United States Patent and Trademark Office*